US007953070B1

(12) United States Patent
Agarwal et al.

(10) Patent No.: US 7,953,070 B1
(45) Date of Patent: May 31, 2011

(54) CLIENT CONFIGURATION DOWNLOAD FOR VPN VOICE GATEWAYS

(75) Inventors: Amit Agarwal, Milptas, CA (US);
David Ahrens, San Jose, CA (US);
Rupesh Kumar, Milpitas, CA (US);
Rohit Mehta, Davis, CA (US); Anupam Rai, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1059 days.

(21) Appl. No.: 11/506,750

(22) Filed: Aug. 17, 2006

(51) Int. Cl.
*H04L 12/66* (2006.01)

(52) U.S. Cl. ............... 370/352; 370/395.21; 370/395.4; 463/40; 700/79; 713/167; 715/738; 726/15

(58) Field of Classification Search .................. 379/67.1; 370/352, 356, 395.52, 401, 395.4, 395.21; 380/28; 455/406, 431; 704/277; 713/153, 713/167; 726/15; 463/40; 700/79; 715/738
See application file for complete search history.

(56) References Cited

U.S. PATENT DOCUMENTS

| 6,079,020 | A | 6/2000 | Liu | |
|---|---|---|---|---|
| 6,226,751 | B1 | 5/2001 | Arrow et al. | |
| 6,233,234 | B1 * | 5/2001 | Curry et al. | 370/356 |
| 6,885,864 | B2 * | 4/2005 | McKenna et al. | 455/431 |
| 6,907,123 | B1 * | 6/2005 | Schier | 380/28 |
| 6,966,003 | B1 * | 11/2005 | Joseph et al. | 726/14 |
| 7,050,424 | B2 * | 5/2006 | Cheng et al. | 370/352 |
| 7,082,122 | B2 * | 7/2006 | Pan | 370/352 |
| 7,120,682 | B1 * | 10/2006 | Salama | 709/222 |
| 7,155,518 | B2 * | 12/2006 | Forslöw | 709/227 |
| 7,292,579 | B2 * | 11/2007 | Morris | 370/395.4 |
| 7,327,721 | B2 * | 2/2008 | Balasaygun et al. | 370/352 |
| 7,366,894 | B1 * | 4/2008 | Kalimuthu et al. | 713/153 |
| 7,469,139 | B2 * | 12/2008 | van de Groenendaal | 455/411 |
| 7,486,684 | B2 * | 2/2009 | Chu et al. | 370/401 |
| 7,505,434 | B1 * | 3/2009 | Backes | 370/331 |
| 7,525,950 | B1 * | 4/2009 | Zhang | 370/352 |
| 7,542,476 | B2 * | 6/2009 | Almog et al. | 370/401 |
| 7,565,689 | B2 * | 7/2009 | Brown et al. | 726/15 |
| 7,583,662 | B1 * | 9/2009 | Ho et al. | 370/356 |
| 7,632,186 | B2 * | 12/2009 | Spanton et al. | 463/40 |
| 7,664,056 | B2 * | 2/2010 | Dye et al. | 370/260 |
| 7,724,657 | B2 * | 5/2010 | Rao et al. | 370/229 |
| 7,743,411 | B2 * | 6/2010 | Ying et al. | 726/15 |
| 7,757,234 | B2 * | 7/2010 | Krebs | 718/101 |
| 7,787,863 | B2 * | 8/2010 | van de Groenendaal | 455/411 |
| 7,808,906 | B2 * | 10/2010 | Rao et al. | 370/235 |
| 7,808,974 | B2 * | 10/2010 | Ying et al. | 370/352 |
| 2002/0026503 | A1 | 2/2002 | Bendinelli et al. | |

(Continued)

FOREIGN PATENT DOCUMENTS

EP 1 521 421 A2 4/2005

(Continued)

*Primary Examiner* — Gerald Gauthier
(74) *Attorney, Agent, or Firm* — Sheridan Ross P.C.

(57) ABSTRACT

In one embodiment, a communication device 204 includes a voice communication module 152 to effect packet-switched voice communications over an untrusted network 140; a secure communication module 228 to create a secured pathway 258 with a selected remote secure communication module 124; and a VPN topology client 232 to contact a VPN topology server 240 to receive VPN topology information 236 that enables the secure communication module to create the secured pathway with the selected remote secure communication module. The VPN topology information includes IP addresses associated with remote secure communication modules, with each of the IP addresses having a corresponding range of node addresses serviced by the respective secure communication module.

18 Claims, 6 Drawing Sheets

U.S. PATENT DOCUMENTS

| | | | |
|---|---|---|---|
| 2002/0061740 A1* | 5/2002 | Lautenschlager et al. | 455/406 |
| 2004/0223497 A1* | 11/2004 | Sanderson et al. | 370/395.52 |
| 2005/0033582 A1* | 2/2005 | Gadd et al. | 704/277 |
| 2006/0104261 A1* | 5/2006 | D'Souza et al. | 370/352 |
| 2006/0200665 A1* | 9/2006 | Olson et al. | 713/167 |
| 2006/0274723 A1* | 12/2006 | Siyavudeen et al. | 370/352 |
| 2007/0277236 A1* | 11/2007 | Yang | 726/15 |
| 2008/0022391 A1* | 1/2008 | Sax et al. | 726/15 |
| 2009/0112336 A1* | 4/2009 | Duffy et al. | 700/79 |
| 2009/0285218 A1* | 11/2009 | Adamczyk et al. | 370/395.21 |
| 2010/0042931 A1* | 2/2010 | Dixon et al. | 715/738 |

FOREIGN PATENT DOCUMENTS

| | | |
|---|---|---|
| WO | WO 01/80521 A2 | 10/2001 |
| WO | WO 2006/012612 A1 | 2/2006 |

* cited by examiner

| SECURITY GATEWAY | ASSOCIATED ADDRESS RANGES |
|---|---|
| 100.100.10.0 | 100.100.10.1 ⋮ 100.100.10.250 |
| 200.200.20.0 | 200.200.20.1 ⋮ 200.200.20.250 |
| ⋮ | ⋮ |
| Y00.Y00.Y0.0 | Y00.Y00.Y0.1 ⋮ Y00.Y00.Y0.250 |

FIG.7

CLIENT CONFIGURATION DOWNLOAD FOR VPN VOICE GATEWAYS

FIELD OF THE INVENTION

The invention relates generally to voice communications and particularly to secure voice communications.

BACKGROUND OF THE INVENTION

Virtual Private Networks (VPNs) are increasing in popularity as the Internet continues to change the face of our society. A VPN is a private data network that offers a point-to-point connection for data traffic between a client and server or multiple servers. The private data network is established over a shared or public network, such as the Internet, with the aid of a special form of encryption and/or some other security technology, such as encrypting not only the data but also the originating and receiving network addresses. The VPN connection across the Internet, for example, logically operates as a Wide Area Network (WAN) link between the dislocated sites, with data being exchanged between peers in secret. The secret connection is known as a VPN tunnel. A "tunnel" is an intermediary program, which is acting as a blind relay between two connections. The tunnel can be formed as defined by any number of protocols, including the Internet Security Protocol or IPSec, the Point-to-Point Tunneling Protocol or PPTP, and the Layer 2 Tunneling Protocol (L2TP).

An example of a VPN-enabled voice communication will now be discussed with reference to FIG. 1. FIG. 1 depicts an enterprise network 100 having a number of dislocated network segments 104, 108, and 112. The network segment 108 is the primary enterprise network segment or site and includes, along with the other (secondary) enterprise segments 104 and 112, a security gateway 116, trusted Local Area Network (LAN) 120, and communication device(s) 124. Additionally, the segment 108 includes an authentication server 128 and switch/server 132. The various enterprise network segments 104, 108, and 112 are in communication with one another and with an external remote communication device 136 via an untrusted (WAN) network 140, such as the Internet. The secure communication device 136 includes a processor 144 and memory 148. The memory 148 includes a Voice over Internet Protocol or VoIP application 152 and an IPSec stack 156 to enable secure communications. As will be appreciated, VoIP is an application used to transmit voice conversations over a data network using the Internet Protocol. Examples of such data networks include the Internet and corporate intranets.

To make a voice call between the secure communication device 136 and a communication device 124 in the enterprise network segments 104 or 112 or between communication devices 124 in the enterprise network segments 104 and 112, the call control signaling and voice data are both routed through the primary enterprise segment 108. More specifically, a persistent secure tunnel 160 is established between the secure communication device and security gateway 116 of the primary enterprise segment 108, tunnel 164 between the security gateway 116 in the enterprise segment 104 and the security gateway 116 in the primary enterprise segment, and tunnel 168 between the security gateway 116 in the enterprise segment 104 and the security gateway 116 in the primary enterprise segment. Call control signaling and voice data are transmitted over these tunnels.

To illustrate the operation of VPN-enabled voice communications, assume a voice call between secure communication device 136 and a communication device 124 in the enterprise network segment 104. The voice data is encrypted by IPSec stack 156 and transmitted over tunnel 160 to the security gateway 116 in the primary enterprise segment, where it is decrypted. The security gateway, noting the destination for the voice data, re-encrypts the voice data and relays it over the tunnel 164 to the security gateway 116 in the segment 104. That security gateway decrypts the voice data and provides it to the communication device 124 over trusted LAN 120.

As can be seen, there is no tunnel directly between the secure communication device 136 and enterprise segments 104 or 112 or between the enterprise segments 104 and 112. This can create problems. The need to redirect the packets over multiple communication paths can cause higher levels of voice data packet latency, loss, and jitter, which can degrade substantially voice communication quality. The redirection of all voice packet traffic through a central location can cause decreased levels of robustness in the VPN architecture. If the primary enterprise site 108 becomes unavailable for any reason, such as the failure of a link or component (e.g., the security gateway 116), the VPN is effectively disabled.

Solutions to the central point of failure problem have been developed in other non-voice applications. For example, VPN remote for Windows 2000XP™ by Avaya, Inc., overcomes the problem by creating point-to-point tunnels between secondary enterprise network segments. This is effected by providing to the security gateways, in each of the secondary enterprise network segments, VPN topology and configuration information. The VPN topology information includes the range of IP addresses serviced by each security gateway and the IP address of the servicing gateway. Using this information, the various gateways can establish point-to-point tunnels that do not include the security gateway at the primary enterprise site and directly exchange data payload packets over the tunnels.

There is a need to provide point-to-point tunnels between security gateways and secure communication devices to enable voice communications in a VPN architecture.

SUMMARY OF THE INVENTION

These and other needs are addressed by the various embodiments and configurations of the present invention. The present invention is directed generally to establishing Virtual Private Network (VPN) tunnels directly between secure communication devices, between a secure communication device and a security gateway in a secondary site, and between security gateways in secondary sites.

In a first embodiment, the present invention is directed to a method for constructing secure voice communications that includes the steps:

(a) creating a first secured pathway (e.g., VPN tunnel) between a first secure communication module (e.g., a Voice over Internet Protocol or VoIP application) and a second secure communication module and a second secured pathway between the first secure communication module and a third secure communication module, the first and third secure communication modules being associated, respectively, with first and third voice communication modules and the second secure communication module being associated with a switch and/or server;

(b) the first voice communication module receiving a call initiation request from a user;

(c) in response, the first secure communication module transmitting, over the first secured pathway, a call initiation message to the switch/server; and (d) when the call is set up, the first secure communication module transmitting, over the second secured pathway, voice data to the third voice communication module.

The first and third voice communication modules can be any type of packet-switched voice communications hardware and/or software, with VoIP software applications being preferred.

As can be seen from the steps, call control signaling is transmitted over the first secured pathway to the switch/server while voice data is transmitted over the second secured pathway to the other voice communication module participating in the call. In other words, the voice data is transmitted over a point-to-point tunnel to the other participating voice communication module rather than to the primary enterprise site followed by relaying of the voice data to the called secondary enterprise site.

By using point-to-point tunnels as communication pathways for voice data, the present invention, compared to the prior art, has decreased levels of voice data packet latency, loss, and jitter, and therefore substantial improvements in voice communication quality (i.e., Quality of Service (QoS)). When compared to the prior art, it can also provide increased levels of robustness in the VPN architecture. If the primary enterprise site 108 becomes unavailable for any reason, such as the failure of a link or component (e.g., the security gateway 116), the VPN is not disabled completely.

Point-to-point tunnels are effected by providing, in a secure session, to the remote secure communication modules VPN topology, and optionally, configuration information. The information is provided normally by a topology server. The information includes the addresses of the various secure communication modules in the VPN and, for each secure communication module, an associated range of serviced addresses. When a call initiation request is received, the called address or an address resolved therefrom is compared with the associated ranges of addresses to determine the particular secure communication module servicing the called address. The voice data is then sent over the VPN tunnel connecting the local secure communication module with the particular secure communication module. Stated another way, the present invention extends the VPN remote solution from the network layer to the application layer in voice communications.

To permit the call and call's voice data to be matched, the voice data includes an identifier associated with the set up call. The identifier is needed because call control signaling and voice data are transmitted over separate secured pathways.

The present invention can provide a number of advantages depending on the particular configuration. For example, the establishment of a secure VPN tunnel to protect sensitive communications between an endpoint telephony component and a secure gateway is a complicated set of transactions. Without some sort of automated configuration mechanism the burden of correctly configuring the end point to support the secure exchange falls on the end user. Worse yet, in the case of a telecommunications equipment, such as a VPN telephone, the end user is not expected to be a competent network engineer and is normally unqualified to understand all the necessary configuration items. The present invention can provide such an automated mechanism for telecommunications equipment, thereby providing enhanced levels of user compatibility, ease of use, and user (telecommuter) satisfaction. For example, the invention can automatically download to the telecommunication equipment all of the necessary configuration items based on the end user ID and password.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 7 depicts a VPN topology mapping table according to an embodiment of the present invention.

DETAILED DESCRIPTION

Figure 2:
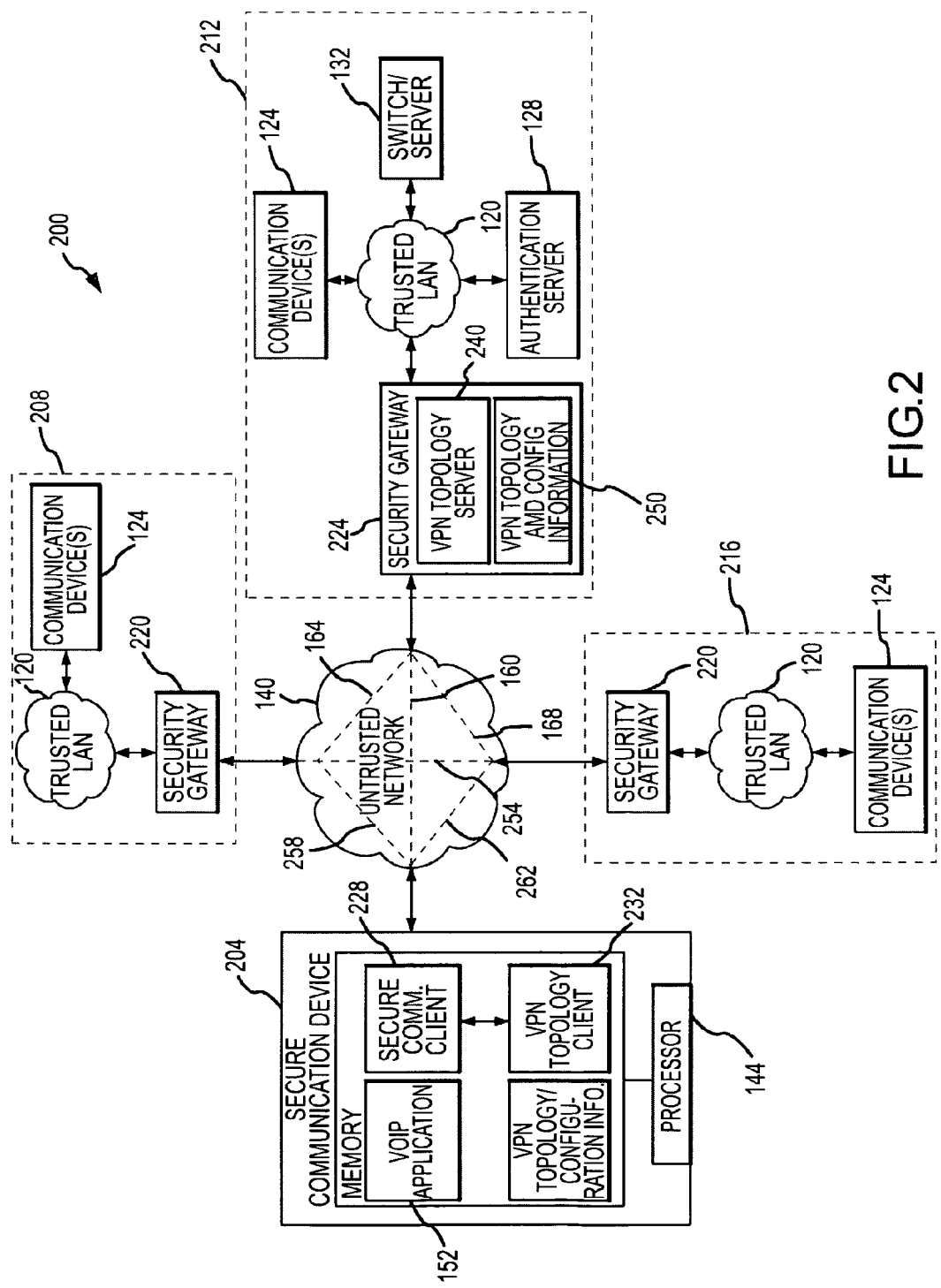
FIG. 2 depicts a VPN voice communications architecture according to an embodiment of the present invention.

FIG. 2 depicts a VPN architecture 200 according to a first embodiment of the present invention. The VPN architecture includes a secure communication device 204, first, second, and third enterprise network segments 208, 212, and 216 forming an enterprise network, interconnected by the untrusted distributed processing (WAN) network 140. The enterprise segments 208 and 216 are secondary enterprise network sites while the enterprise segment 212 is the primary enterprise network site.

Each of the enterprise network segments 208, 212, and 216 includes a security gateway 220 and 224, a trusted LAN 120, and one or more communication devices 124. Additionally, the primary enterprise segment 212 includes a switch/server 132 to control voice calls and an authentication server 128.

The communication devices 124 and 204 are preferably packet-switched devices, such as Voice over IP (VoIP) hardphones (e.g., Avaya Inc.'s 4600 Series IP Phones™), VoIP softphones (e.g., Avaya Inc.'s IP Softphone™), Personal Digital Assistants or PDAs, instant messaging devices, Personal Computers, laptop computers, and the like. Examples of suitable devices are the 30000™, 4600™, 4610SW™, and 20002™ IP telephones of Avaya, Inc. While the device 204 is external to the enterprise network 200, the devices 124 are internal. An "external" communication device is not controlled by the switch/server 132 (e.g., does not have an extension serviced by the switch/server 132) while an "internal" device is controlled by the switch/server 132.

The security gateways 220 and 224 can be any suitable gateway modified in accordance with the principles of the present invention. The security gateways provide signal control and conversion capabilities between the untrusted network 140 and the trusted networks 120. Each gateway is positioned logically between the trusted network 120 and the other elements of the corresponding enterprise network segment on the one hand and the untrusted network 140 on the other to process communications passing between components of the respective network segment and the untrusted network 140. Any suitable gateway providing a secure boundary between the enterprise network segment and the network 140 may be used. The security gateway typically includes a secured communication client, such as an IPSec client, and can include a Network Address Translation or NAT module. For example, exemplary modified gateways include Avaya Inc.'s, G700™, G650™, G600™, MCC/SCC™ media gateways.

The untrusted network 140 can be any partitioned data and/or distributed processing network, such as an intranetwork or an internetwork (e.g., the Internet). The network 140 typically includes additional proxy servers (not shown), registrars (not shown), gateways (not shown), and routers (not shown) for managing packet flows.

The switch/server 132 directs communications, such as incoming Voice Over IP or VoIP calls, in the enterprise network 308. The terms "switch", "server", "switch/server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The switch/(media) server can be any architecture for directing contacts to one or more communication devices. Illustratively, the switch/server 132 of FIG. 2 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; and/or Avaya Inc.'s DEFINITY™, COMMUNICATION MANAGER™, or MULTI-VANTAGE™ private-branch exchange (PBX)-based ACD system. The switch/server 132 typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch/server comprises a network interface card to provide services to the associated communication devices 124.

The authentication server 128 effects authentication of network components and/or users thereof to confirm that they are who they profess to be. In other words, the server 128 determines the identity of the entity attempting to access a system or information. The authentication server may use any technique enabling it to identify and reject automatically messages that have been altered deliberately or by channel errors. Any suitable protocols can be used to effect authentication. Examples include public key cryptography protocols, interlock protocols, asymmetric and symmetric cryptography protocols, and protocols using digital certificates and signatures.

According to an embodiment of the present invention, the secure communication device 204 and each of the security gateways 220 (though not shown) include a secured communication client 228, such as an IPSec client, to setup and administer the secure tunnel(s) and a VPN topology client 232 to obtain, from the primary enterprise segment 212, VPN topology and configuration information 236. The security gateway 224 includes a VPN topology server 240 to provide to authenticated entities the VPN topology and configuration information 250.

An example of the VPN topology and configuration information 236 and 250 is provided by FIG. 7. The information includes not only the IP address of the switch/server 132 and/or gatekeeper but also the IP addresses of the various security gateways 220 and 224 and the IP address ranges serviced by each of the gateways (or the IP address ranges in the associated enterprise network segment). In one configuration, the information can further include the IP address of each external secure communication device. As can be seen from the foregoing, each gateway and client 228/232 will know the VPN topology, including the IP addresses of every other gateway and client 228/232.

What information is in the VPN topology and configuration information 236 and 250 depends on the authorized access given to the secure communication device 204 and secondary segments 208 and 216. The information 250 may include the same or more information when compared with the VPN topology and configuration information 236. Additionally, the information 236 in the secure communication device 204 may differ from that in one or more of the security gateways 220 in the secondary enterprise network segments 208 and 216.

In one configuration, the client 232 is able to access configuration information from an external configuration source, such as Lightweight Directory Access Protocol (LDAP) or Remote Authentication Dial In User Service (RADIUS) server to acquire configuration data and then download the data to the secured communication device firmware in a format that can populate the configuration tables within the device. Examples of configuration information include IP address of the switch/server 132, and IP address of the gatekeeper.

Figure 1:
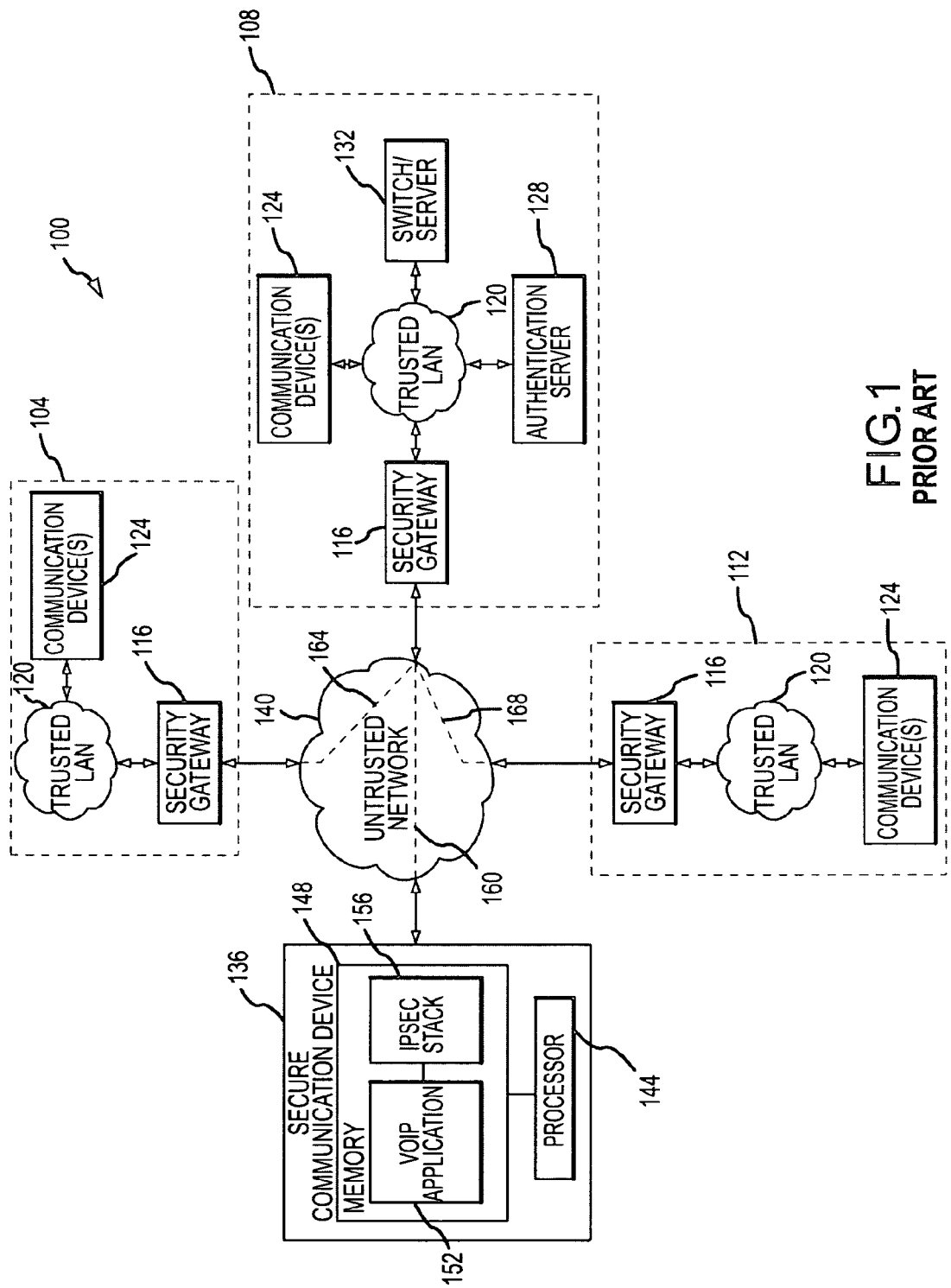
FIG. 1 depicts a prior art VPN voice communications architecture.

Each of the VPN topology clients 232 provides the information to the secure communication client 228 and is able to create a persistent tunnel not only with the security gateway 224 in the primary enterprise segment 212 but also with the security gateways in secondary enterprise segments and/or secure communication clients 228 in external secure communication devices. As shown in FIG. 2, for example, when compared to FIG. 1 three new VPN tunnels are established, namely a first tunnel 254 between the security gateways 220 in the secondary enterprise segments 208 and 216, a second tunnel 258 between the secure communication device 204 and the security gateway 220 in the secondary enterprise segment 208, and a third tunnel 262 between the secure communication device 204 and the security gateway 220 in the secondary enterprise segment 216.

Figure 3:
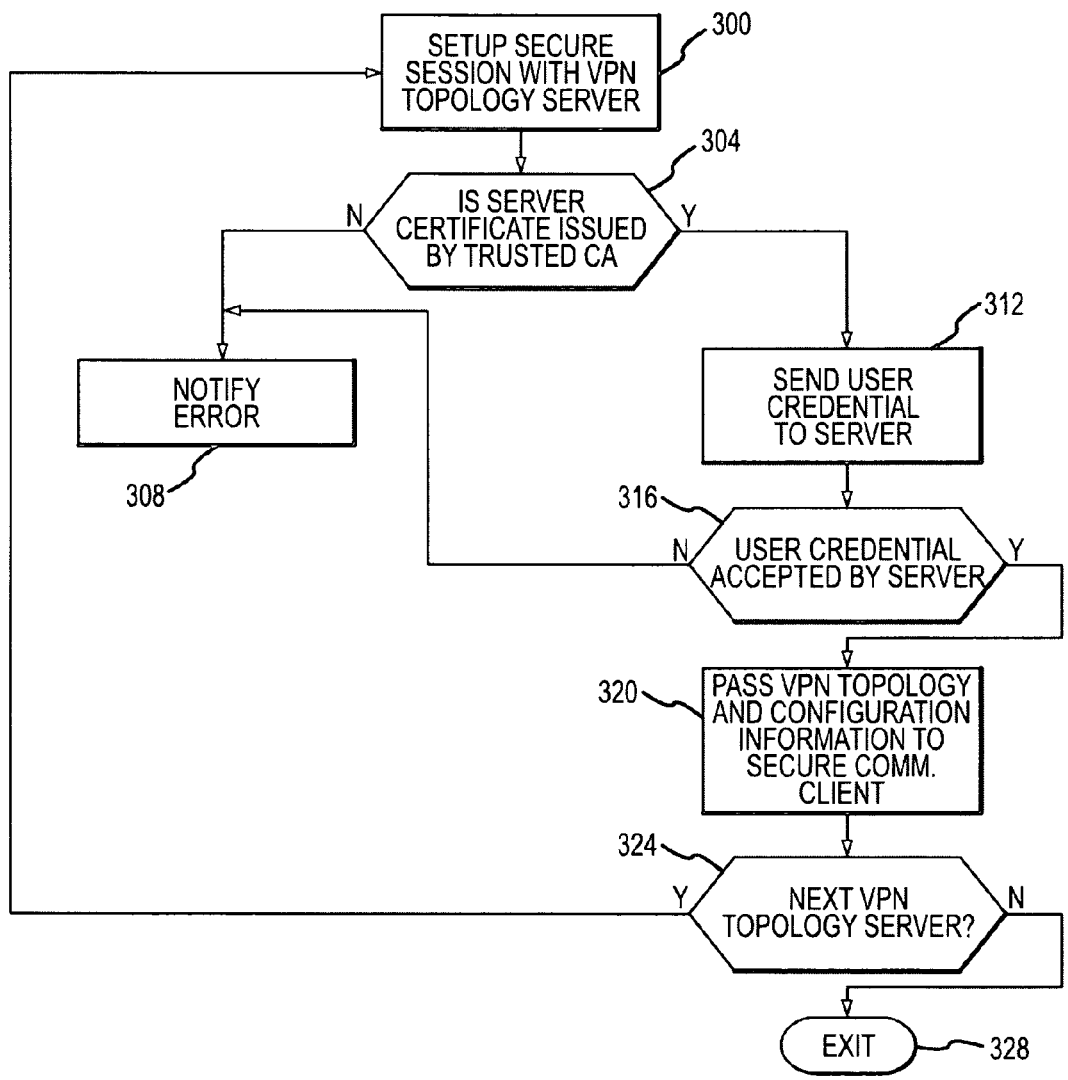
FIG. 3 is a flowchart depicting an operational embodiment of the VPN topology client according to an embodiment of the present invention.
Figure 4:
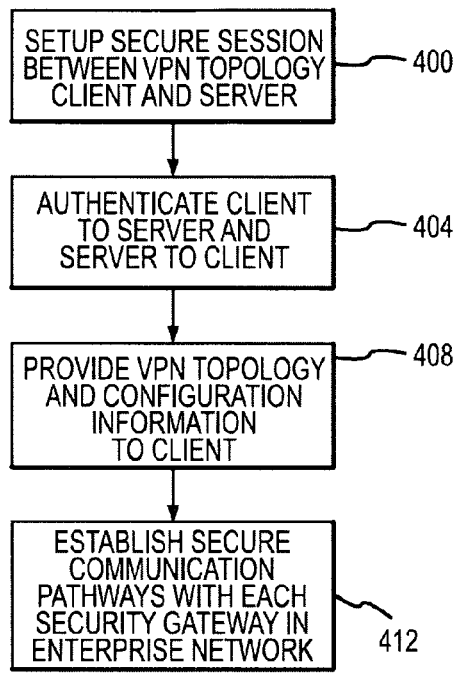
FIG. 4 is a flowchart depicting the establishment of a VPN tunnel according to an embodiment of the present invention.

The operation of the VPN topology client 232 and server 240 will now be discussed with reference to FIGS. 3 and 4.

In steps 300 and 400, a secure session, such as using the Transport Layer Security (TLS) protocol, is set up between the VPN topology client 232 and server 240. The VPN topology client 232 has the IP address of the VPN topology server 240 in permanent memory to enable it to know where to go to obtain the topology and configuration information. The VPN topology and configuration information, however, is normally not maintained in persistent memory of the secure communication device or gateways 220 due to memory constraints.

In step 404, the client 232 is authenticated to the server 240 and vice versa. FIG. 3 depicts the steps, in one configuration, to effect authentication by the client of the server. In decision diamond 304, the client 232 determines whether the certificate received from the server 240 is issued by a trusted Certificate Authority (CA). If not, the client 232, in step 308, notifies the user and/or server 240 of an error. If the certificate is issued by a trusted CA, the client in step 312 sends its user's credentials (e.g., user ID and password), globally unique identifier, brand identifier, message acknowledgement, and IP address request (for an IP address to be assigned to the client) to the server, which, along with authentication server 128, authenticates the credentials. In decision diamond 316, the client 232 determines whether the credential(s) supplied to the server 240 by the client 232 have been accepted by the server 240. If not, the client 232, in step 308 notifies the user of an error.

When the client and server have authenticated one another successfully, the server provides to the client, in steps 320 and 408, the VPN topology and configuration information 250, or a subset thereof. This connection, unlike a tunnel, is typically not persistent. In addition to the information noted previously, the supplied information further includes the IP address assigned to the client, Domain Name Service (DNS) to be used by client, Windows Internet Naming Service (WINS), and client configuration control record (e.g., containing download options such as split tunneling or save configuration in a file). As will be appreciated, the IP address is a virtual IP address that is not connected to a specific computer or network interface card on a computer. For IPSec clients, for example, a virtual IP address is provided by the security gateway to the client. The client then creates a virtual interface and sets up the routing table such that all packets sent by the TCP/IP stack are routed through the virtual interface instead of the real Network Interface Card (NIC). All the packets are encapsulated inside IPSec packets and sent over the wire to the security gateway.

In decision diamond 320, the client 232 determines whether there is a further VPN topology server 240 to be contacted. This may be the case where the enterprise is administered to have multiple such servers 240, each at an enterprise segment having its own switch/server. Large enterprise voice communication networks frequently have multiple switch/servers at different dislocated enterprise segments. Redundancy can also be provided by having multiple VPN topology servers 240.

When there is a further server to be queried, the client returns to and repeats step 300. When there is not a further server to be queried, the client exits in step 328. In other words, the secure session is terminated. All routing table changes in the received VPN topology information are applied.

Having received the VPN topology and configuration information, the clients 232 and 228 collectively contact each of the identified security gateways/secure communication clients and establish point-to-point tunnels therebetween.

In one configuration, the clients 232 create a mapping table (not shown) that contains not only the IP address of the security gateway/client and associated IP address range (if any) as shown in FIG. 7 but also an identifier of the corresponding tunnel with the respective gateway. The identifier, for example, can be a port number on the gateway/secure communication device with which the tunnel is associated. In this manner, when the client 228 receives an inputted address from a user, the client 232 can map the inputted address to determine the appropriate security gateway servicing the destination device and also the corresponding tunnel identifier.

Figure 5:
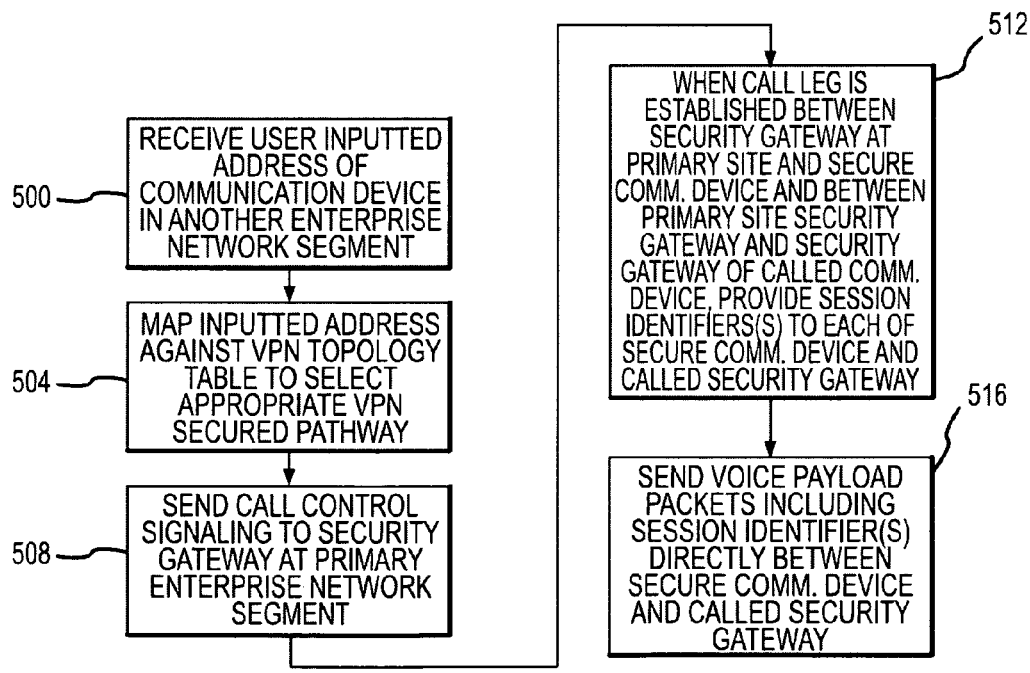
FIG. 5 is a flowchart depicting the establishment of a voice call according to an embodiment of the present invention.
Figure 6:
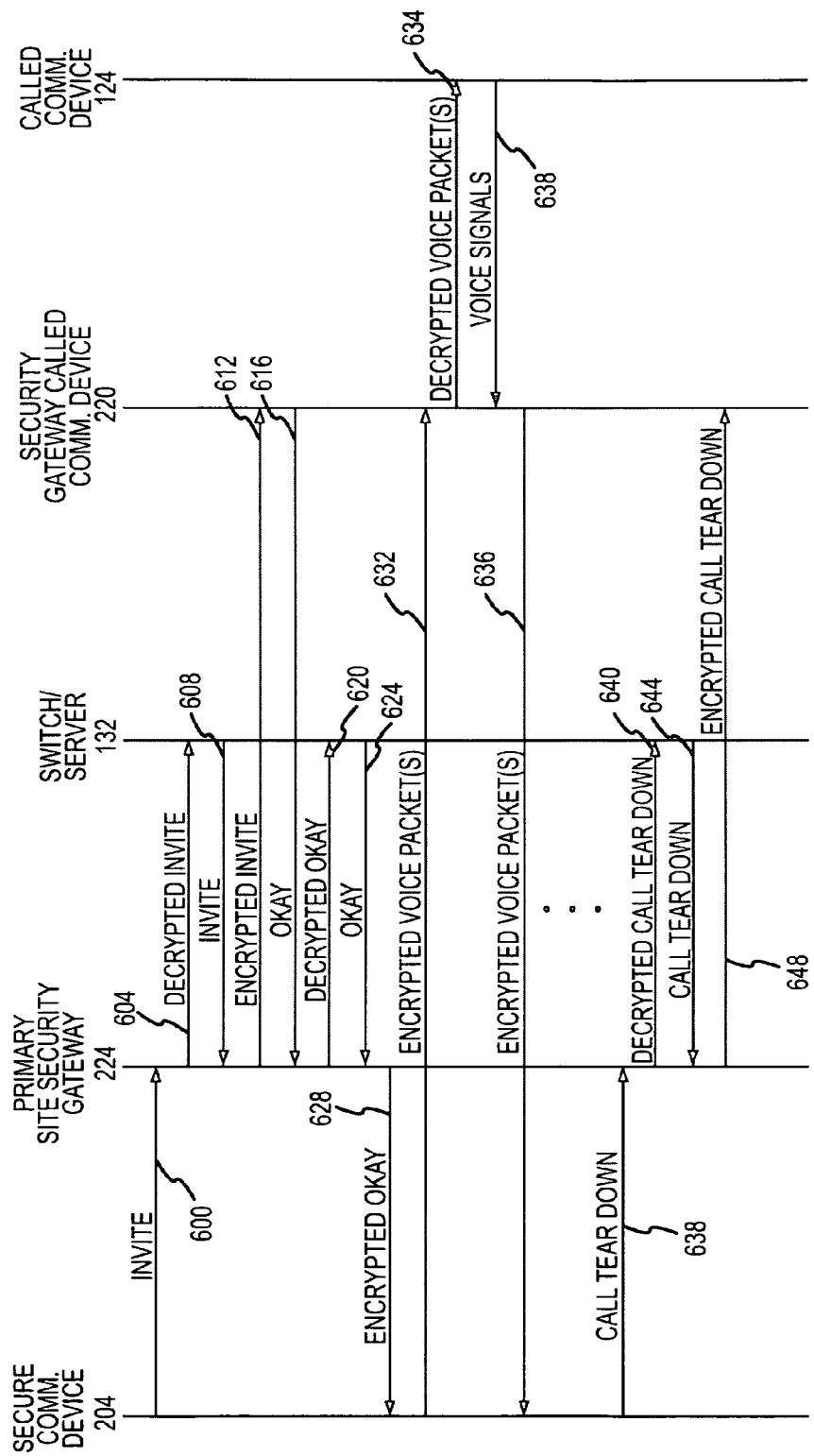
FIG. 6 depicts signal flows for the establishment, performance, and disconnection of the voice call.

The steps for establishing a live voice contact, or voice call, will now be discussed with reference to FIGS. 5 and 6. This example assumes that the VoIP application 152 has registered with the switch/server 132.

In step 500, the client 228 receives a destination address (e.g., telephone number, IP address, etc.) from the user for purposes of establishing a voice call. It is assumed that the destination address corresponds to an internal communication device or a secure communication device of an enterprise network subscriber. When the destination address is a telephone number, the address may need to be resolved to a corresponding IP and/or Ethernet address.

In step 504, the client 232 maps the destination (IP) address against the VPN topology and configuration information 236 to select the appropriate VPN secured pathway or tunnel.

In steps 508 and 512, the VoIP application 152 sends an INVITE message to the secured communications client 228, which encrypts the message and sends an encrypted counterpart 600 over the tunnel 160 to the primary site security gateway 224. The gateway 224 decrypts the INVITE message and forwards the plaintext version 604, over the trusted LAN 120, to the switch/server 132. In response, the switch/server 132 sends to the security gateway 224 a plaintext INVITE message 608 destined for the called communication device 124. The message 608 is encrypted 612 and forwarded over tunnel 164 to the security gateway 220. In response, the gateway 220 returns, over tunnel 164, an encrypted OKAY message 612 to the security gateway 224. The gateway 224 decrypts the OKAY message and forwards the decrypted message 620 to the switch/server 132. The switch/server 132, in response, sends to the gateway 224, over the trusted LAN 120, a plaintext OKAY message 624 destined for the calling communication device 204. The gateway 224 encrypts the message and sends the encrypted OKAY message 628, over tunnel 160, to the communication device 204.

At this juncture there are two legs of the call that have been set up. The first leg is over tunnel 160 and the second is over tunnel 164. To enable the voice data to be forwarded over a third leg, namely the point-to-point tunnel 258, the INVITE message 612 and/or OKAY messages 628 include an identifier of one or both of the first and second legs. The identifier can be arbitrarily chosen, a port number, a session identifier, and the like. It is used by the security gateway 220 and/or client 228 to pair up the voice data with the appropriate established call.

At this point, the VoIP application 152 has been instructed by the switch/server 132 to commence sending voice data to the called communication device.

In step 516, the VPN topology client 232 based on the VPN topology received from the VPN topology server knows that the called communication device is in enterprise segment 208 and instructs the secure communication client 228 to commence sending voice (e.g., Real-Time Protocol (RTP)) data 632 over the tunnel 258 to the security gateway 220 of the called communication device 208. The packetized voice data includes, in the packet header, payload, or trailer, the identifier. The gateway 220 decrypts the voice data and sends the plaintext data, over LAN 120, to the called communication device 124. The called communication device 124, in turn, generates voice data and forwards it 638 in plaintext form to the security gateway 220 over LAN 120. The gateway 220 encrypts the data and sends the encrypted voice packet(s) 636 to the secure communication device 204. Because the secure communication device 204 is a single device, the identifier may or may not be included in the packetized voice data.

When the tunnel 258 has not yet been established when the call is set up, the agent 228 is instructed by the security gateway 224 to send voice data via the tunnel 160. Voice data is sent and, at the same time, the client 228 contacts the gateway 220 servicing the called communication device 124 to build the tunnel 258. When the tunnel 258 is constructed, the client 228 and gateway 224 commence exchanging voice data over the tunnel 258.

When the call is disconnected, a tear down message is sent to the security gateway 224 over the appropriate tunnel. Assuming, for example, that the calling communication device 204 disconnects first, the VoIP application 152 will generate a tear down message, an encrypted version 638 of which is sent, over tunnel 160, to the gateway 224. The gateway 224 decrypts the tear down message and sends it 640 to the server. The switch/server 132, in response, generates a tear down message destined for the called communication device 124 and sends it 644 to the gateway 224. The gateway 224 encrypts the message and sends it 648, over tunnel 164, to the security gateway 220.

Although the call signaling has been discussed with reference to the Session Initiation Protocol or SIP, it is to be understood that the invention may be configured for other telecommunications protocols, such as H.323 and the like.

A number of variations and modifications of the invention can be used. It would be possible to provide for some features of the invention without providing others.

In other embodiments, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for constructing secure voice communications, comprising:
   (a) creating, by a first secure communication device including a first secure communication client and a first secure communication application, a first secured pathway between the first secure communication client and a second secure communication device having a second secure communication client and a second secured pathway between the first secure communication client and a third secure communication device having a third secure communication client, the first and third secure communication clients being associated, respectively, with first and third voice communication applications and the second secure communication client being associated with a switch or server;
   (b) the first voice communication application receiving a call initiation request from a user;
   (c) in response, the first secure communication application transmitting, over the first secured pathway, a call initiation message to the switch or server;
   (d) when the call is set up, the first secure communication client transmitting, over the second secured pathway, voice data to the third voice communication application;
   (e) the first secure communication client receiving an address of a topology server;
   (g) the first secure communication client establishing a secure session with the topology server; and
   (h) the first secure communication client receiving from the topology server a set of addresses of a plurality of secure communication clients and, for each secure communication client, an associated range of serviced addresses, the set of addresses including the address of the third secure communication client.

2. The method of claim 1, wherein the first voice communication application and secure communication client are in an external secure communications device, wherein the first and third voice communication applications are Voice over Internet Protocol applications, wherein the first and second secured pathways are tunnels, and further comprising:
- (i) the first voice communication application receiving a call disconnect signal from a user, the call disconnect signal being associated with the voice call; and
- (j) the first secure communication client forwarding a call disconnect message to the switch/server over the first secured pathway.

3. The method of claim 1, wherein the first secure communication client, in the secure session, further receives configuration information for the first voice communication application and wherein the secure session is not conducted by means of the first or second secured pathway.

4. The method of claim 1, wherein the voice data includes an identifier associated with the set up call.

5. The method of claim 1, wherein the call initiation request includes a called address and wherein step (b) comprises the substep of:
- (b1) comparing the called address or an address resolved therefrom with the associated ranges of addresses to determine that at least one of the third secure communication client and second secure pathway corresponds to the called address.

6. A tangible, non-transit computer readable medium comprising processor executable instructions, stored on the tangible computer readable medium, to perform the steps of claim 1.

7. A communication device, comprising:
- a local voice communication application operable to effect packet-switched voice communications over an untrusted network;
- a local secure communication client operable to create a secured pathway with a selected remote secure communication client associated with a remote voice communication application, the secured pathway carrying voice data received from a user by the local voice communication application; and
- a VPN topology client operable to contact a VPN topology server to receive VPN topology information to enable the local secure communication client to create the secured pathway with the selected remote secure communication client, wherein the VPN topology information comprises a plurality of IP addresses associated with a plurality of remote secure communication clients and wherein each of the IP addresses has a corresponding range of node addresses serviced by the respective secure communication client;
- wherein the local secure communication client, in a secure session with the VPN topology server over the untrusted network, is operable to receive the VPN topology information and configuration information for the local voice communication application and wherein the secure session is not conducted by means of a secured pathway.

8. The device of claim 7, wherein the device is in communication, via the untrusted network, with a first and second remote secure communication clients, wherein the local voice communication application and secure communication client are in an external secured communication device, wherein a first secured pathway is positioned between the local secure communication client and the first remote secure communication client, and wherein a second secured pathway is positioned between the local secure communication client and the second secure communication client, the first remote secure communication client being associated with a first remote voice communication application and the second secure communication client being associated with a switch and/or server.

9. The device of claim 8, wherein the local voice communication application is operable to receive a call initiation request from a user, wherein the local secure communication client is operable to transmit, over the second secured pathway, a call initiation message to the switch/server; and wherein, when the call is set up, the local secure communication client is operable to transmit, over the first secured pathway, voice data to the first remote voice communication application.

10. The device of claim 9, therefrom with the corresponding ranges of node addresses to determine that the wherein the local and first remote voice communication applications are Voice over Internet Protocol applications, wherein the first and second secured pathways are tunnels, and wherein the local secure communication client is operable to receive a call disconnect message, the call disconnect signal being associated with the voice call; and forward the call disconnect message to the switch/server over the second secured pathway.

11. The device of claim 9, wherein the voice data includes an identifier associated with the set up call.

12. The device of claim 9, wherein the call initiation request includes a called address and wherein the VPN topology client is operable to compare the called address or an address resolved therefrom to determine that first remote secure communication client and first secure pathway corresponds to the called address.

13. A secure voice communications method, comprising:
- (a) an external voice communication device establishing a secure session over an untrusted network with a security gateway associated with a voice communications switch and/or server, the external voice communication device comprising a voice communication application;
- (b) during the secure session, providing, by a security gateway, Virtual Private Network (VPN) topology information to the external voice communication device, wherein the VPN topology information comprises a plurality of IP addresses associated with a plurality of remote secure communication clients and wherein at least some of the IP addresses has a corresponding range of node addresses serviced by the respective secure communication client; and
- (c) with the VPN topology information, establishing, by the security gateway, a VPN tunnel, wherein establishing the VPN tunnel comprises:
  - (c1) creating a first secured pathway between a first secure communication client and a second secure communication client and a second secured pathway between the first secure communication client and a third secure communication client, the first and third secure communication clients being associated, respectively, with first and third voice communication applications and the second secure communication client being associated with a switch and/or server;
  - (c2) the first voice communication application receiving a call initiation request from a user;
  - (c3) in response, the first secure communication client transmitting, over the first secured pathway, a call initiation message to the switch and/or server;
  - (c4) when the call is set up, the first secure communication client transmitting, over the second secured pathway, voice data to the third voice communication application.

14. The method of claim 13, wherein the external voice communication device further receives, in the secure session, configuration information and wherein the configuration information includes an IP address for a secure communication client in the communication device.

15. The method of claim 13, further comprising:
   (a) receiving a network address of a remote voice communication application, the remote voice communication application being associated with a remote secure communication client, wherein a first VPN tunnel connects a local secure communication client in the external voice communication device with the security gateway; and
   (b) sending call signaling to set up the call over the first tunnel.

16. The method of claim 15, wherein a second VPN tunnel connects the local secure communication client with a remote secure communication client associated with the called remote voice communication application and, after the call is established, further comprising:
   (f) forwarding voice data from the call over the second VPN tunnel.

17. The method of claim 16, wherein, when a call disconnect signal is received by the local voice communication application, a call disconnect message is sent to the switch and/or server over the first VPN tunnel and then by switch and/or server over a third VPN tunnel to the called remote voice communication application, the third VPN tunnel connecting the security gateway with remote secure communication client associated with the called remote voice communication application.

18. A tangible, non-transit computer readable medium comprising processor executable instructions stored on the tangible computer readable medium, to perform the steps of claim 13.

* * * * *

UNITED STATES PATENT AND TRADEMARK OFFICE
CERTIFICATE OF CORRECTION

| | | |
|---|---|---|
| PATENT NO. | : 7,953,070 B1 | |
| APPLICATION NO. | : 11/506750 | |
| DATED | : May 31, 2011 | |
| INVENTOR(S) | : Amit Agarwal et al. | |

It is certified that error appears in the above-identified patent and that said Letters Patent is hereby corrected as shown below:

Column 14, line 13, after "instructions" insert --,--.

Signed and Sealed this
Thirteenth Day of March, 2012

David J. Kappos
*Director of the United States Patent and Trademark Office*